US006460757B1

(12) United States Patent
Ommundsen

(10) Patent No.: US 6,460,757 B1
(45) Date of Patent: Oct. 8, 2002

(54) APPARATUS AND METHOD FOR FORMING SLOTTED WIRE SCREENS

(75) Inventor: Dag Ommundsen, Telemark (NO)

(73) Assignee: NEWScreen AS (NO)

( * ) Notice: Subject to any disclaimer, the term of this patent is extended or adjusted under 35 U.S.C. 154(b) by 0 days.

(21) Appl. No.: 09/711,876

(22) Filed: Nov. 14, 2000

(51) Int. Cl.[7] ........................ B23K 31/02; B23K 37/00; B23K 21/00

(52) U.S. Cl. .......................... 228/265; 228/5.7; 228/17; 228/141.1

(58) Field of Search .............................. 228/141.1, 265, 228/164, 173.1, 189, 222, 4.1, 5.1, 6.1, 6.2, 15.1, 17, 18, 46

(56) References Cited

U.S. PATENT DOCUMENTS 3,664,502 A * 5/1972 Nichols, Jr. ................. 209/270
3,920,170 A 11/1975 Colburn et al.
4,066,202 A 1/1978 Binard
4,160,146 A 7/1979 Mundel et al.
4,221,951 A 9/1980 Connolly
4,283,278 A 8/1981 Savage et al.
4,295,918 A 10/1981 Benson et al.
4,319,112 A 3/1982 Connolly
4,406,326 A 9/1983 Wagner
4,529,520 A 7/1985 Lampenius
4,539,457 A 9/1985 Pinger et al.
4,555,055 A 11/1985 Connolly
4,658,867 A 4/1987 Hasak
4,734,552 A 3/1988 Brolin
4,818,403 A 4/1989 Nagaoka
4,828,689 A 5/1989 Lamort
4,846,971 A 7/1989 Lamort
4,901,417 A 2/1990 Chupka et al.
4,911,209 A 3/1990 Smith et al.
5,011,065 A 4/1991 Musselmann
5,013,879 A 5/1991 Lind
5,020,575 A 6/1991 Grabuschnig et al.
5,023,986 A 6/1991 Gero et al.
5,047,148 A 9/1991 Arai
5,064,536 A 11/1991 Bratten
5,064,537 A * 11/1991 Chupka et al. ............. 162/251
5,090,721 A 2/1992 Lange
5,094,360 A 3/1992 Lange
5,200,072 A 4/1993 Frejborg et al.
5,211,208 A 5/1993 Ritter et al.
5,237,154 A 8/1993 Pellhammer et al.
5,246,158 A 9/1993 Nagaoka et al.
5,307,984 A 5/1994 Nagaoka et al.
5,387,340 A 2/1995 Ackerman
5,415,294 A 5/1995 Nagaoka
5,433,849 A 7/1995 Zittel
5,446,254 A 8/1995 Ritter et al.
5,472,095 A 12/1995 Malm
5,476,588 A 12/1995 Nagaoka
5,503,323 A 4/1996 Bergkvist et al.
5,586,662 A 12/1996 Aikawa
5,587,073 A 12/1996 Zittel
5,595,307 A 1/1997 Hautala (List continued on next page.)

*Primary Examiner*—M. Alexandra Elve
*Assistant Examiner*—Zidia Pittman
(74) *Attorney, Agent, or Firm*—Heller Ehrman White & McAuliffe LLP

(57) ABSTRACT

An apparatus and method for forming slotted wire screens is provided. According to one embodiment, the method involves the steps of (1) providing support ring material; (2) positioning a wire on the support ring material; (3) joining the wire and the support ring material; and (4) bending the support ring material to form a ring of a radius. The steps of joining and bending are performed at substantially the same time. According to another embodiment, the apparatus includes a device for pushing support ring material; a device for providing the support ring material with an adhesive, such as a brazing compound; a device for positioning a wire on the support ring material; a heating zone for heating the support ring material and the wire; and a device for bending the support ring material.

30 Claims, 8 Drawing Sheets

U.S. PATENT DOCUMENTS 5,605,234 A 2/1997 Aikawa
5,607,587 A * 3/1997 Langner .................... 209/270
5,622,625 A 4/1997 Nagaoka
5,647,128 A 7/1997 Aikawa
5,718,826 A 2/1998 Frejborg
5,727,316 A 3/1998 Riendeau
5,768,783 A 6/1998 Lange
5,791,495 A 8/1998 Gero et al.
5,804,075 A 9/1998 Aikawa
5,823,355 A 10/1998 Abdulmassih et al.
5,954,956 A 9/1999 Lutz et al.
5,971,160 A 10/1999 Abdulmassih et al.

* cited by examiner

APPARATUS AND METHOD FOR FORMING SLOTTED WIRE SCREENS

BACKGROUND OF THE INVENTION

1. Field of the Invention

The present invention relates generally to slotted hole screens which are suited for use in devices for separating or leaning aqueous fiber suspensions, in particular, for paper manufacturing.

2. Description of the Related Art

In the manufacture of paper, there are various steps that require the treatment of aqueous solutions, for example, removing or aligning fibers in the solution. This treatment is generally performed with slotted hole screens having wire-shaped or bar-shaped longitudinal members defining the screen slots. The longitudinal members are mounted on cross bars. These slotted hole screens are commonly referred to as "wedgewire screens." An example of such a wedgewire screen is provided in U.S. Pat. No. 5,011,065, the disclosure of which is incorporated by reference in its entirety.

There are three principle methods for constructing wedgewire screens. The first method uses resistive welding. In this method, "profilated" wire, that is, wire having a predetermined profile, is pressed down and into a support ring by using a combination of high pressure and high current. This will cause the edge of the wire to melt into the support rings. The advantage of this method is that it is fast; however, there are significant shortcomings. For example, the weld is typically small and brittle. This makes the screen unsuitable for applications that involve significant pulsation and/or vibration. Inside a wedgewire screen for the pulp and paper industry, there normally is heavy pulsation and vibration. This causes a significant number of mechanical failures on the resistance welded portions of the slotted wire screens.

In addition, there may be a problem with plugging. Near the weld, there are usually a significant number of sharp burrs. These burrs may not be large, but they are usually large enough to cause fibers to stick to them. After some time, the fibers accumulate such that the screen will be plugged.

For the pulp and paper industry, it is desirable to have a certain angle at the top of the wire, and that angle may, to a certain degree, be achieved by tilting the wire. This is difficult to achieve in production. When pressure is added to the tilted wire during welding, the wire will, very often, have the tendency to tilt slightly more or slightly less than the desired angle. This will, of course, make the angle uneven, and the slot opening between the wires will vary accordingly.

The next most common method for forming slotted screens is Gas Tungsten Arc welding, or TIG welding, of the wires on the support rings. The advantage of this method is that the weld is bigger and stronger, and is more suitable for a pulsation and vibration environment. If the welding is performed properly, there will not be any burrs on the screens. Despite these advantages, the method is very slow. Further, a "comb" will have to be produced to act as a jig for the wire, so that the wire can be positioned with the desired angle and slot width. Thus, each size wedgewire screen will require its own jig, resulting in manufacturers maintaining a large number of jigs.

The third method involves the mechanical locking of wires to the support rings. An example of such is shown in U.S. Pat. No. 5,090,721, the disclosure of which is incorporated by reference in its entirety. In this example, the wire has a bulb on the backside, which fits into a precut groove in the support ring. When this screen is rolled into a cylinder, there will be significant pressure between the wires, which keeps the wires locked into the support ring. Although this may, for the most part, be a good solution; mechanical locking, however, does not work well on high-grade stainless steel. Higher grades of stainless steel have a tendency to stretch over time, especially under the application of continuous load.

A common problem with the aforementioned methods is that the screen is made in the form of a flat panel first, and that screen panel is then rolled up to the correct radius afterwards. This rolling process may create distortions in the slot width if the support ring is too strong. To avoid this problem, the support ring that is on the original flat panels is very small and weak; this is compensated for later by welding additional support rings to the original, smaller support rings. This creates significant shrink and stress in the material, and is also very time-consuming.

Some manufactures shrink extra support rings on the original support ring. This creates problems, however, because forces from the original support ring are generally not evenly transferred to the outer support ring.

SUMMARY OF THE INVENTION

Therefore, a need has arisen for an apparatus and method for forming slotted wire screen that overcomes these and other shortcomings.

According to one embodiment of the present invention, a method for forming a slotted wire screen is disclosed. The method involves the steps of (1) providing support ring material; (2) positioning a wire on the support ring material; (3) joining the wire and the support ring material; and (4) bending the support ring material to form a ring of a radius. The steps of joining and bending may be performed at substantially the same time.

According to another embodiment of the present invention, a method for forming a slotted wire screen is disclosed. The method involves the steps of (1) providing support ring material; (2) providing the support ring material with a brazing compound; (3) positioning a profilated wire on the support ring material; (4) passing the support ring material and the positioned profilated wire through a heating zone; and (5) cooling the profilated wire and support ring material. In the heating zone, the profilated wire and the support ring material are brazed by the heat, and, at substantially the same time, the support ring material is bent to form a ring.

According to another embodiment of the present invention, an apparatus for forming a slotted wire screen is disclosed. The apparatus includes a device for pushing support ring material; a device for providing the support ring material with an adhesive, such as a brazing compound; a device for positioning a wire on the support ring material; a heating zone for heating the support ring material and the wire; and a device for bending the support ring material.

According to another embodiment of the present invention, a method for forming a slotted wire screen is disclosed. The method includes the steps of (1) providing a cage material, the cage material comprising at least one piece of support ring material and at least one piece of wire joined to the support ring material; and (2) bending the cage material to form a ring of a radius. The bending may be performed by at least one arm or at least one roller. The cage material may include support ring material and profilated wire that are prejoined and preformed.

A technical advantage of the present invention is that an apparatus and method for forming slotted wire screens is disclosed. Another technical advantage of the present invention is that the connection between the profilated wire and the support ring is large, making the screen sturdy and strong. Another technical advantage is that there are no burrs formed in the brazing process. Yet another technical advantage of the present invention is that the screen will be practically free from internal stresses due to the very high temperature used for brazing and bending. Another technical advantage of the present invention is that, because two operations are performed at the same time, it is very cost effective. Another technical advantage of the present invention is that because no force is added to the profilated wires during roll up or later, the high precision of the slotted screen is preserved.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF THE PREFERRED EMBODIMENT

Embodiments of the present invention and their technical advantages may be better understood by referring to FIGS. 1 through 8, like numerals referring to like and corresponding parts of the various drawings.

Figure 1:
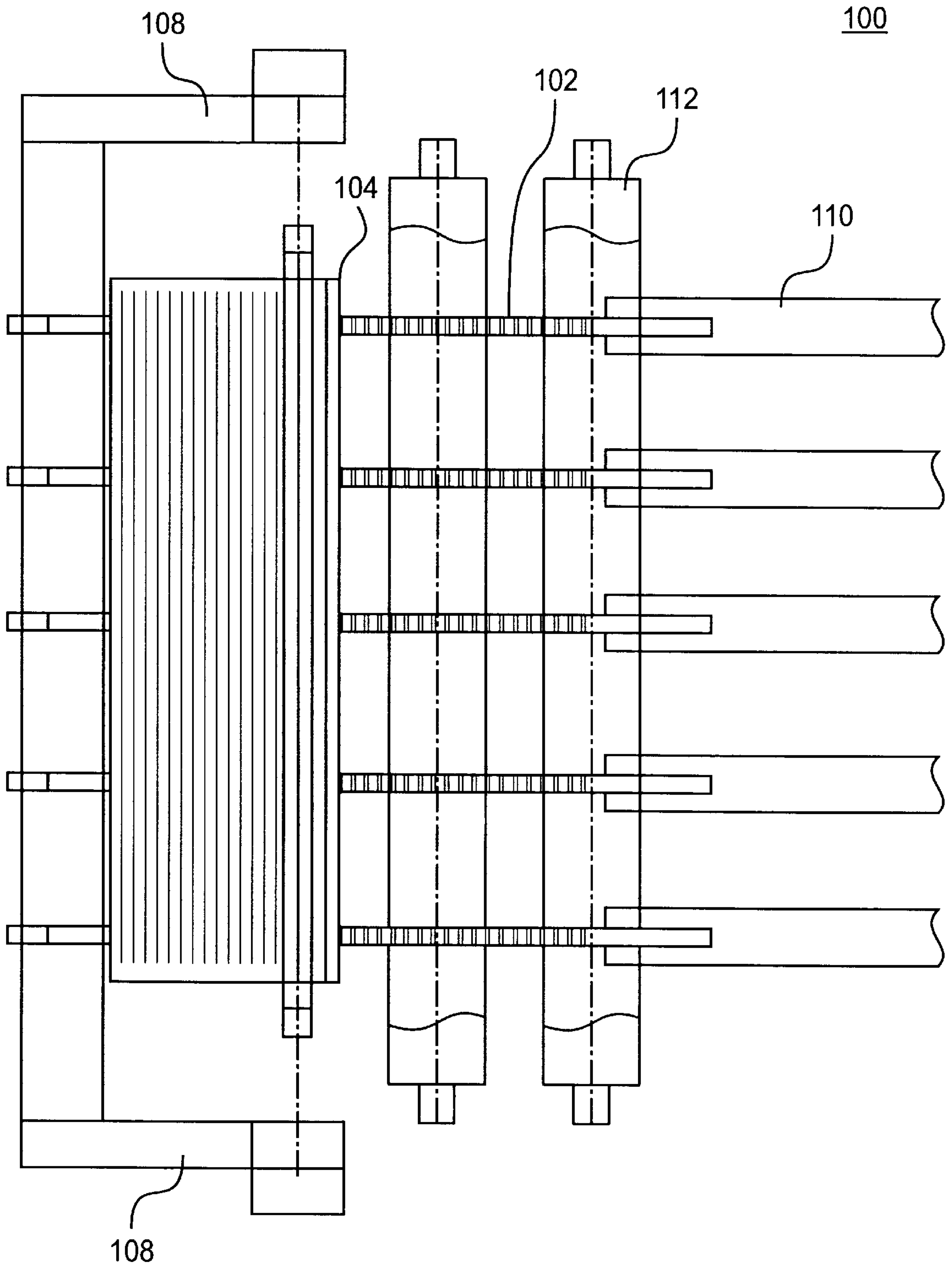
FIG. 1 is a top view of an apparatus for forming a slotted wire screen according to one embodiment of the present invention.
Figure 2:
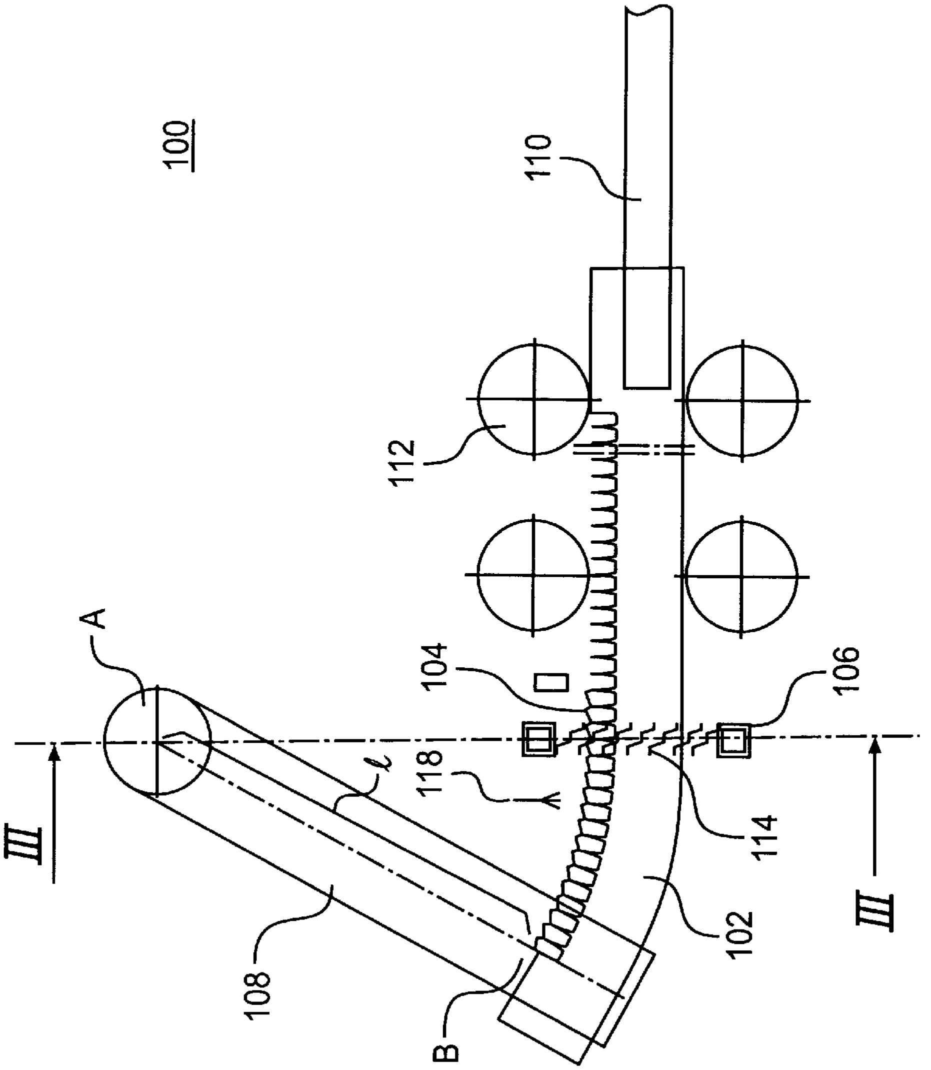
FIG. 2 is a side view of the apparatus of FIG. 1.
Figure 3:
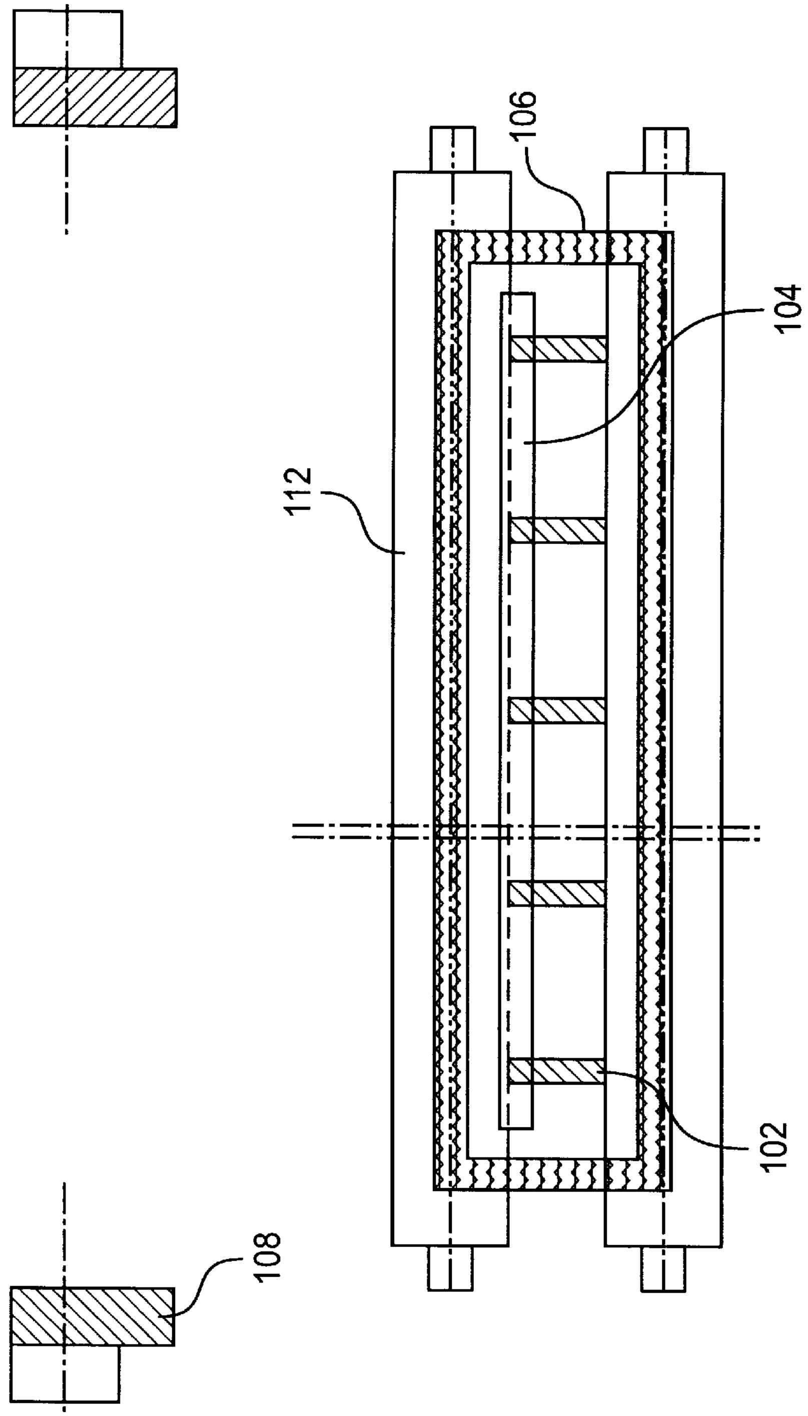
FIG. 3 is a sectional view of the apparatus in FIG. 2 taken along line III—III.

Referring to FIGS. 1 to 3, an apparatus for forming wedgewire screens according to one embodiment of the present invention is provided. Apparatus 100 comprises heater 106, at least one arm 108, pushing device 110, guide rollers 112, heating zone 114, and sprayer 116.

Pushing device 110 pushes support ring material 102 toward heating zone 114. In one embodiment, pushing device may include hydraulic cylinders, screws with electric motors, etc.

Arms 108 are provided to cause support ring material 102 to bend to form a ring having a predetermined radius. In one embodiment, one arm 108 is provided for each piece of support ring material 102. In another embodiment, fewer arms 108 than the number of pieces of support ring material 102 are provided. For example, two arms may be provided, although more than two pieces of support ring material are shaped.

Length, l, of arms 108, that is, the length from point A, where arm 108 is connected to support ring material 102, to point B, the hinge for arm 108, may be adjustable. Length l determines the radius of the ring formed by bending support ring material 102.

Support ring material 102 may be preformed with grooves for receiving profilated wire 104. Support rings material 102 may also be precut in straight lengths equal to about the desired circumference of the formed ring. Support ring material 102 may be as heavy as desired.

In one embodiment, a device for forming a groove in support ring material 102 for receiving profilated wire 104 may be provided. This may involve cutting a groove in support ring material 102 before profilated wire 104 is positioned in support ring material 102. This may be accomplished by any suitable device, including cutting devices, laser devices, high pressure water, a punching device, etc.

Guide rollers 112 may be provided to guide support ring material 102 as it is pushed toward heating zone 114 by pushing device 110.

Heating zone 114 is provided with heater 106 and sprayer 116. Just before support ring 102 material enters heating zone 114, support ring material 102 is sprayed with a brazing paste, such as PN 38750, available from Eutectic Corporation, Charlotte, N.C. Profilated wire 104 may then be lowered, dropped, or positioned, into the preformed groove formed in support ring 102.

Heater 106 may be any conventional heating device, and provides heating zone 114 with a high temperature. In one embodiment, heater 106 is an induction heater, and provides heating zone 114 with a temperature of about at least 1075° C. Other temperatures may be desired, depending on the materials being brazed, the brazing compound, etc.

As the heating zone causes support ring material 102 and profilated wire 104 to be brazed together, arm 108 serves to bend support ring material 102 into a ring of a desired radius. This bending is the result of the heat from heating zone 114.

In one embodiment, heating zone 114 may be very limited in size, so that all excess brazing paste will only flow down support ring material 102, so that the desired gaps between profilated wire are not obstructed.

As support ring material 102 and profilated wire 104 exit heating zone 114, they may be sprayed with water by cooling sprayer 118. The application of water serves to cool support ring material 102 and profilated wire 104, as well as to reduce any further bending of support ring material 102. This water may be in the form of a mist, or it may be in a heavier stream. Other appropriate cooling methods and devices may be used.

Figure 4:
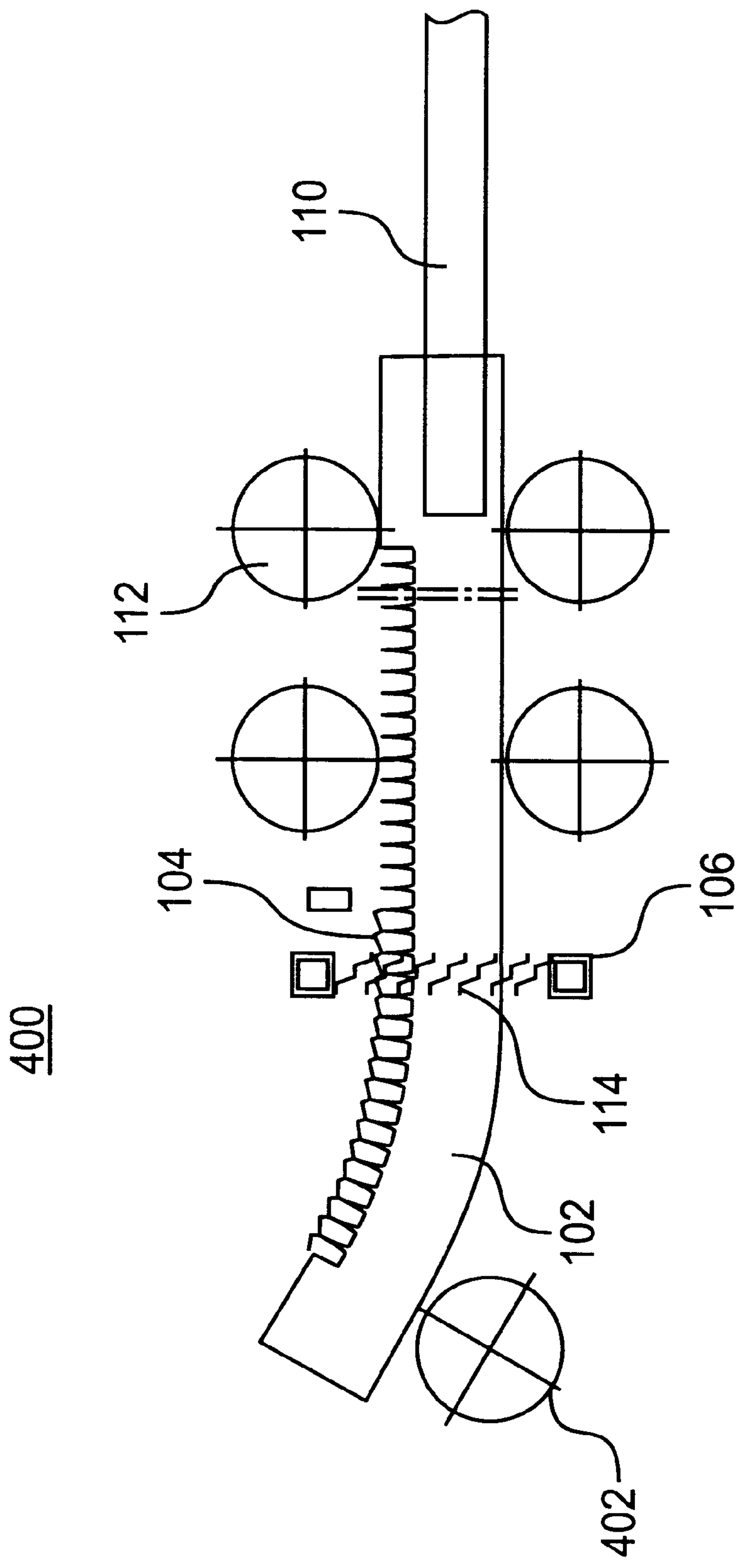
FIG. 4 is a side view of an apparatus for forming a slotted wire screen according to another embodiment of the present invention.

Referring to FIG. 4, an apparatus for forming wedgewire screens according to another embodiment of the present invention is provided. Apparatus 400 has many of the same parts as in FIGS. 1–3; therefore, a discussion of like parts is omitted.

Instead of using arms, apparatus 400 includes at least one roller 402, which is provided to shape support ring material 102. The position of roller 402 may be adjustable, and determines the radius of support ring 102. As support ring material 102 is pushed into heating zone 114, the upward pressure from at least one roller 402 causes the portion of support ring material 102 in heating zone 114 to bend, resulting the formation of a ring of a desired radius. Other methods and devices for causing support ring material 102 to bend may also be used.

Figure 5:
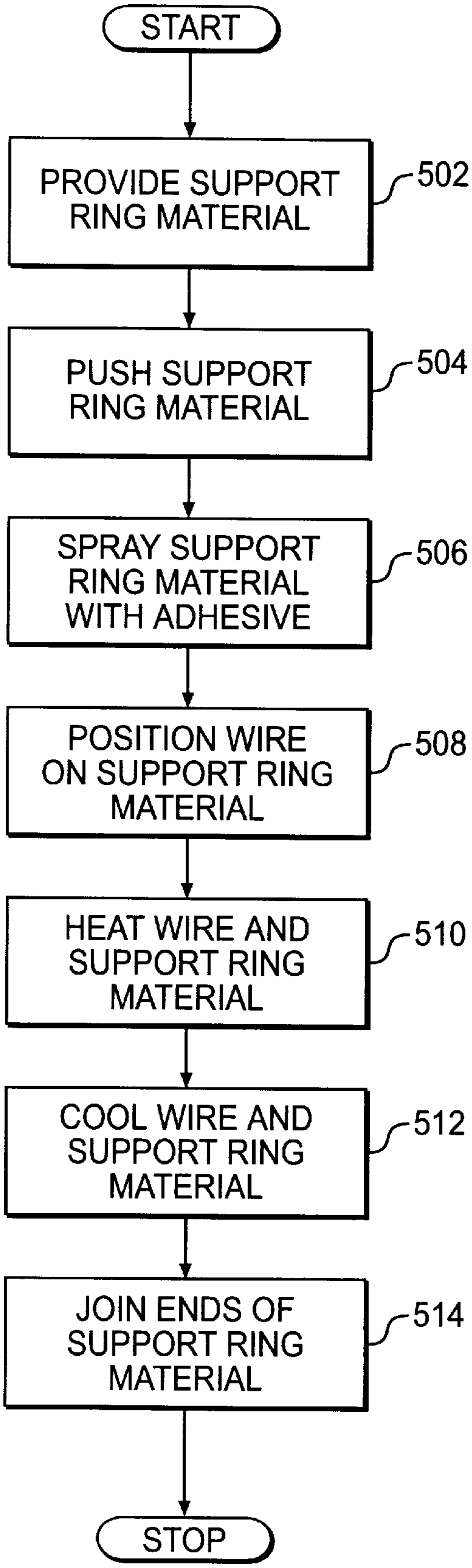
FIG. 5 is a flowchart of the method according to one embodiment of the present invention.

Referring to FIG. 5, a method for forming a wedgewire screen according to one embodiment of the present invention is provided. In step 502, at least one piece of support ring material is positioned in the apparatus. Referring to FIG. 1, five pieces of support ring material are provided equidistantly for each wedgewire screen. Other numbers of pieces of support ring material, positioning, and distributions thereof may be used as desired or required.

As discussed above, the support ring material may be precut to a predetermined length, or it may have a significantly longer length. Support ring material may have preformed grooves for receiving profilated wire. In another embodiment, a device may be provided for forming a groove for receiving the profilated wire before the support ring material is sprayed with an adhesive material.

The pieces of support ring material may be positioned in the apparatus such that the grooves on each support ring line up; that is, so that a profilated wire can be properly inserted into the grooves of the pieces of support ring material.

In one embodiment, this step further includes attaching at least one arm to the support ring material. One arm may be provided for each piece of support ring material; in other embodiments, only the outer pieces of support ring material are provided with arms. The radius of the wedgewire screen may be set by adjusting the length of the arms. In another embodiment, at least one roller may be used to set the radius of the wedgewire screen. The position of the roller may be adjusted until the predetermined radius is achieved.

Referring again to FIG. 5, in step 504, the support ring material may be "pushed" toward the heating zone of the apparatus. This may be achieved through any device that can push the support ring material. In one embodiment, this may be accomplished with a hydraulic cylinders, screws with electric motors, etc.

In step 506, the support ring material may be sprayed with an adhesive, such as a brazing compound. Suitable adhesives include PN 38750, available from Eutectic Corporation, Charlotte, N.C.

In step 508, profilated wire may be positioned in the grooves of the support ring material. The profilated wire may be positioned at a substantially perpendicular position to the support rings material, or they may be positioned with an offset at a predetermined angle from the axis of the support ring material. Referring to FIG. 1, profilated wire 104 is positioned in support ring material 102 such that profilated wire 104 is substantially perpendicular to each piece of support ring material 102.

Referring again to FIG. 5, in step 510, the support ring material and profilated wire are heated in a heating zone. As discussed above, this may include an induction heater that provides a temperature of at least 1075° C. Other heating devices may be provided.

As the support ring material and profilated wire are heated, they may be bent by arms, a roller, or any other suitable device. In particular, the area of the support ring material that is susceptible to bending is the area that is heated. Thus, the brazing and bending may occur substantially at the same time, although one process may take longer than the other.

In one embodiment, where a brazing compound is used, the heat causes the profilated wire and the support ring material to braze, and any excess brazing compound runs down the support ring material. Any excess brazing compound may be collected in a collection bin (not shown).

In step 512, as the brazed and bent support ring material and profilated wire exit the heating area, they may be cooled. In one embodiment, this may be accomplished by spraying a water mist over the support ring material and profilated wire. Other methods of cooling the support ring material and profilated wire may also be used.

In step 514, once a ring of a predetermined radius has been formed, the pieces of the support ring material are joined. In one embodiment, where a continuous supply of support ring material is used, the support ring material may be cut. The joining may be performed on the apparatus, or it may be performed separately.

According to another embodiment of the present invention, the support ring material and wire may be prejoined before being bent to an appropriate shape and size. This may be shown in both FIGS. 6 and 7. In these figures, like numerals are used to describe corresponding elements from FIGS. 1–4, so a further description of these elements is omitted.

Figure 6:
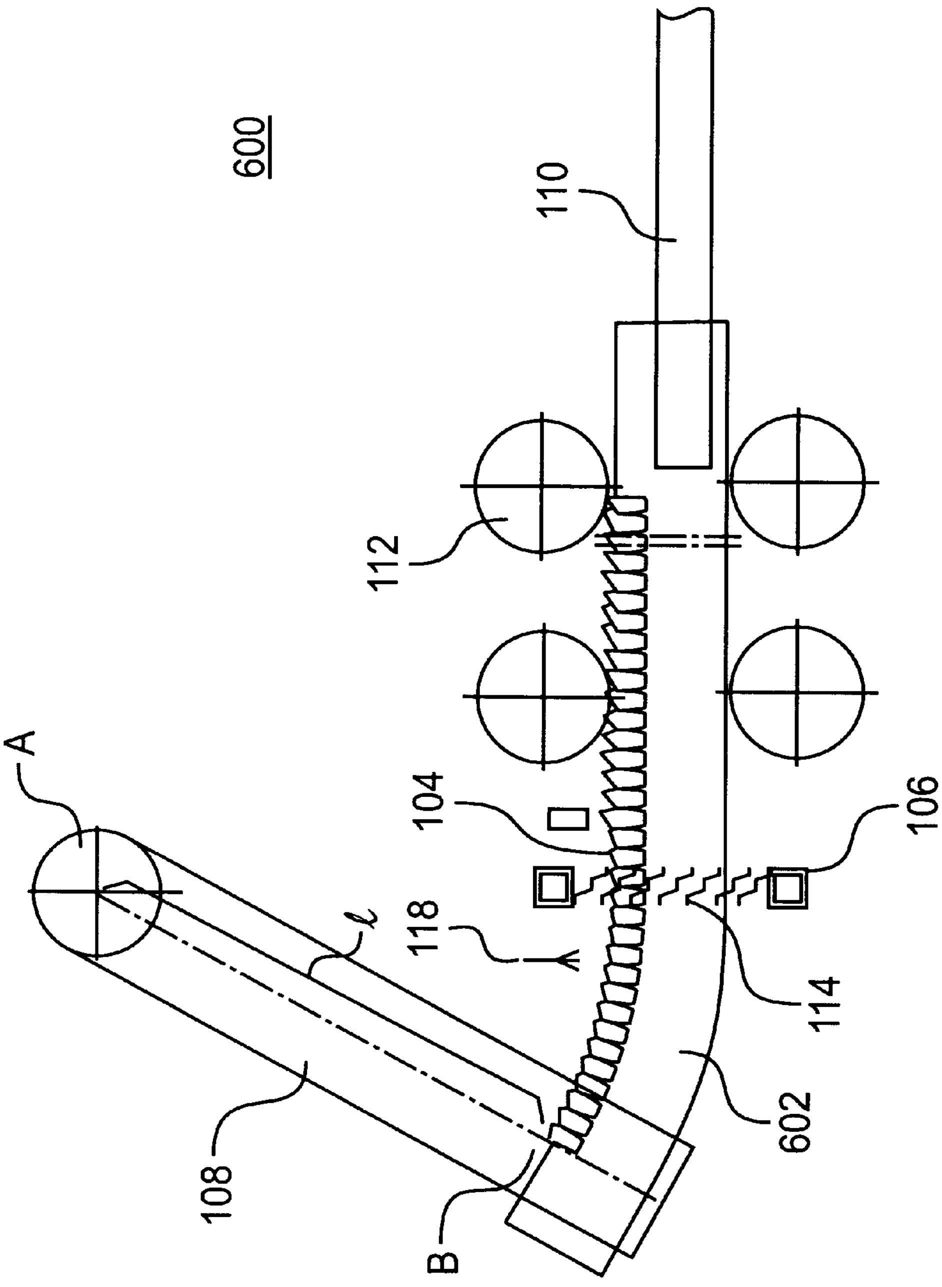
FIG. 6 is a side view of an apparatus for forming a slotted wire screen according to another embodiment of the present invention.
Figure 7:
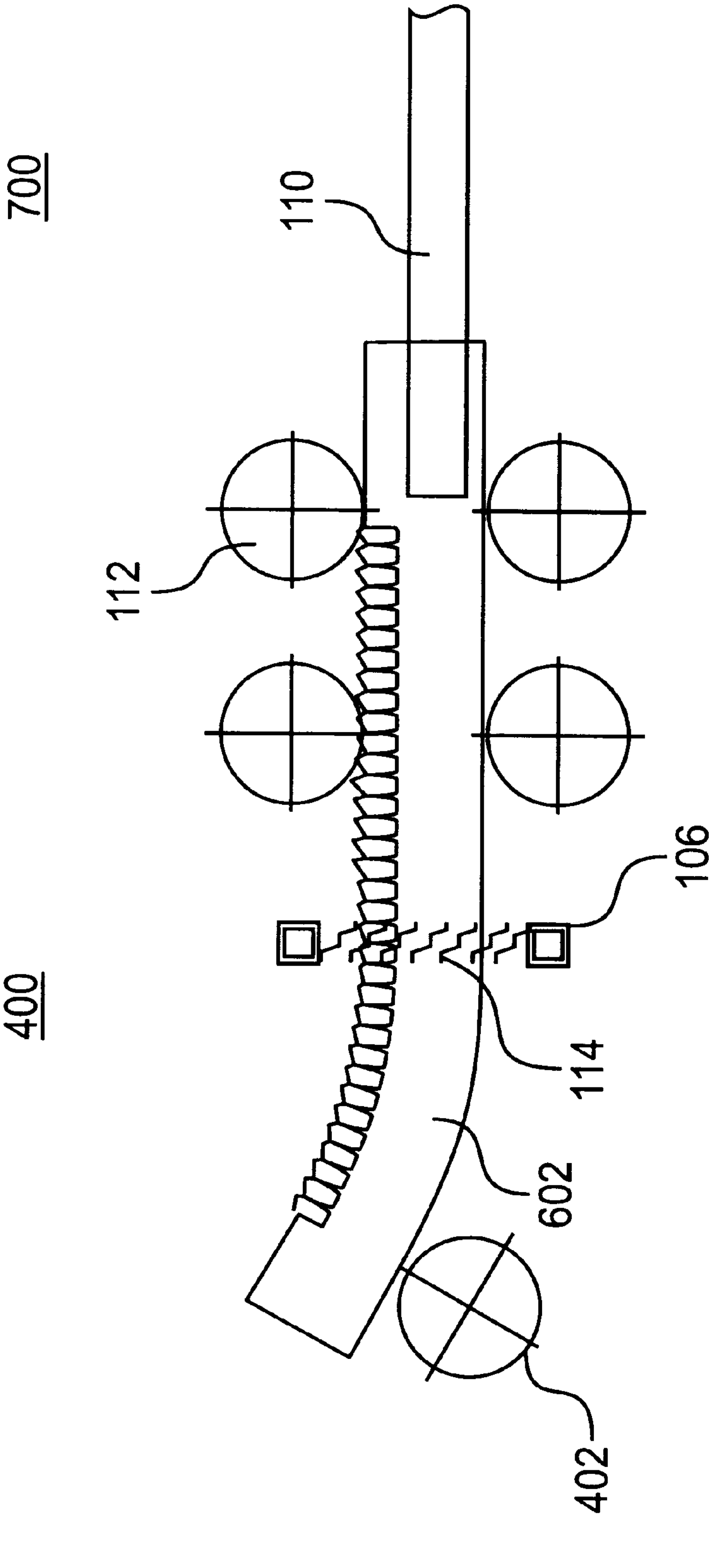
FIG. 7 is a side view of an apparatus for forming a slotted wire screen according to another embodiment of the present invention.

Referring to FIGS. 6 and 7, cage material 602 is provided. In one embodiment, cage material 602 may comprise support ring material and profilated wire that are prejoined. In one embodiment, cage material 602 may be provided in an unbent form. Thus, cage material may be provided in various lengths. Apparatus 600 and apparatus 700 may shape and bend cage material 602 to a desired shape and size.

Figure 8:
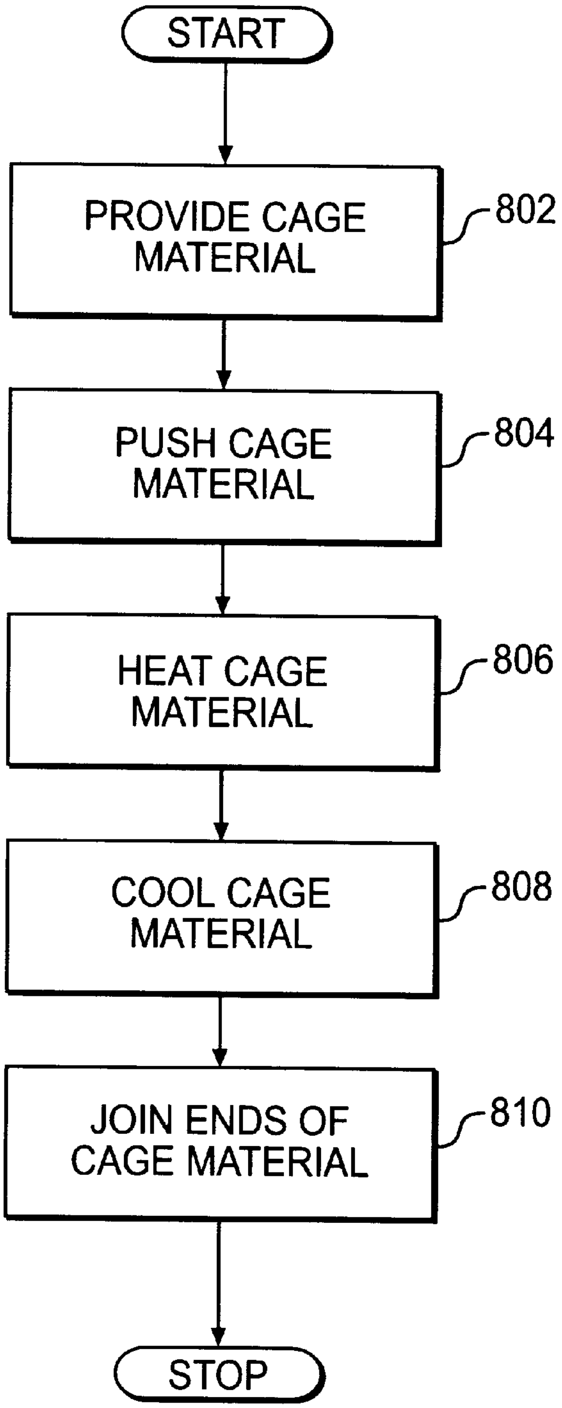
FIG. 8 is a flowchart of the method according to another embodiment of the present invention.

Referring to FIG. 8, a method for forming a wedgewire screen according to another embodiment of the present invention is provided. In step 802, cage material is provided. As discussed above, cage material comprise support ring and profilated wire that are prejoined and unbent. The cage material may be provided in an unbent form.

In step 804, the cage material may be "pushed" toward the heating zone of the apparatus. This may be achieved through any device that can push the cage material. In one embodiment, this may be accomplished with a hydraulic cylinders, screws with electric motors, etc.

In step 806, the cage material may be heated in a heating zone. As discussed above, this may include an induction heater that provides a temperature of at least 1075° C. Other heating devices may be provided.

As the cage material is heated, the cage material may be bent by arms, a roller, or any other suitable device. In particular, the area of the cage material that is susceptible to bending is the area that is heated.

In one embodiment, additional adhesive, such as a brazing compound, may be provided to the cage material.

In step 808, as the cage material exits the heating area, it may be cooled. In one embodiment, this may be accomplished by spraying a water mist over the cage material. Other methods of cooling the cage material may also be used.

In another embodiment, the cage material is not heated before bending; thus, no cooling is required.

In step 810, once a ring of a predetermined radius has been formed, the pieces of the cage material are joined. In one embodiment, where a continuous supply of cage material is used, the cage material may be cut. The joining may be performed on the apparatus, or it may be performed separately.

Although the present invention has been described with reference to the use of profilated wire, other types of wire may be used.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. All references cited herein for any reason, including all U.S. Patents, are specifically and entirely incorporated by reference. It is intended that the specification is considered as exemplary only, with the true scope and spirit of the invention being indicated by the following claims.

What is claimed is:

1. A method for forming a slotted wire screen, comprising:

providing at least one piece of support ring material;

positioning at least one wire on said support ring material in a heating zone;

joining the wire and the support ring material in a heating zone; and bending the support: ring material to form a ring of a radius;

wherein the step of joining and bending are performed at substantially the same time.

2. The method of claim 1, wherein the step of providing at least one piece of support ring material comprises:

attaching at least one arm to the support ring material.

3. The method of claim 2, wherein a length of the at least one arm is adjustable.

4. The method of claim 3, wherein the length of the at least one arm determines the radius of the ring.

5. The method of claim 1, wherein the step of providing at least one piece of support ring material comprises:

positioning the support ring material on at least one roller.

6. The method of claim 5, wherein a position of the at least one roller is adjustable.

7. The method of claim 6, wherein the position of the at least one roller determines the radius of the ring.

8. The method of claim 1, further comprising:

forming a groove in the support ring material for receiving the wire.

9. The method of claim 1, wherein the support ring material comprises grooves for receiving the wire.

10. The method of claim 1, further comprising:

providing an adhesive on the support ring material.

11. The method of claim 10, wherein the adhesive is a brazing compound.

12. The method of claim 1, wherein the step of positioning at least one wire on said support ring material comprises:

positioning the wire substantially perpendicular to the support ring material.

13. The method of claim 1, wherein the step of positioning at least one wire on said support ring material comprises:

positioning the wire at a predetermined angle to an axis of the support ring material.

14. The method of claim 1, further comprising the step of:

cooling the support ring material and the wire after the step of joining.

15. The method of claim 14, wherein the step of cooling the support ring material and the wire after the step of joining comprises:

spraying a cooling liquid on the support ring material and the wire.

16. The method of claim 1, wherein the wire comprises profilated wire.

17. A method for forming a slotted wire screen, comprising:

providing at least one piece of support ring material;

providing the at least one piece of support ring material with a brazing compound;

positioning a profilated wire on the support ring material; and passing the support ring material and the positioned profilated wire through a heating zone wherein the profilated wire and the support ring material are brazed by the heat in the heating zone, and the support ring material is bent to form a ring having a radius at substantially the same time; and cooling the profilated wire and support ring material.

18. The method of claim 17, further comprising:

providing at least one arm for the support ring material for bending the support ring material, wherein a length of the at least one arm determines the radius of the ring.

19. The method of claim 17, further comprising:

providing at least one roller for bending the support ring material, wherein a position of the at least one roller determines the radius of the ring.

20. An apparatus for forming a slotted wire screen, comprising:

a device for pushing at least one piece of support ring material;

a device for providing the support ring material with an adhesive;

a device for positioning a wire on the support ring material;

a heating zone for heating the support ring material and the wire; and a device for bending the support ring material.

21. The apparatus of claim 20, further comprising:

a cooling device for cooling the support ring material and the wire.

22. The apparatus of claim 20, wherein the device for bending the support ring material comprises:

at least one arm, a length of the at least one arm determining the radius of the ring.

23. The apparatus of claim 20, wherein the device for bending the support ring material comprises:

at least one roller, a position of the at least one roller determining the radius of the ring.

24. The apparatus of claim 20, wherein the device for bending the support ring material bends the support ring material in the heating zone.

25. A method for forming a slotted wire screen, comprising:

providing a cage material, the cage material comprising at least one piece of support ring material and at least one piece of wire joined to the support ring material; and heating and bending the cage material to form a ring of a radius using at least one of an at least one arm and an at least one roller.

26. The method of claim 25, wherein a length of the at least one arm is adjustable.

27. The method of claim 26, wherein the length of the at least one arm determines the radius of the ring.

28. The method of claim 25, wherein a position of the at least one roller is adjustable.

29. The method of claim 28, wherein the position of the at least one roller determines the radius of the ring.

30. The method of claim 25, further comprising the steps of:

cooling the cage material after the step of bending.

* * * * *